US008232660B2

(12) United States Patent
Ito et al.

(10) Patent No.: US 8,232,660 B2

(45) Date of Patent: Jul. 31, 2012

(54) SOUNDPROOF ENCLOSED TYPE GENERATOR

(75) Inventors: Takashi Ito, Saitama (JP); Kaku Okabe, Saitama (JP); Taiyo Onodera, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 585 days.

(21) Appl. No.: 12/267,946

(22) Filed: Nov. 10, 2008

(65) Prior Publication Data

US 2009/0121492 A1 May 14, 2009

(30) Foreign Application Priority Data

Nov. 12, 2007 (JP) ................................ 2007-293077

(51) Int. Cl.
*F02B 63/04* (2006.01)
*H02K 9/04* (2006.01)

(52) U.S. Cl. .......................... 290/1 B; 290/1 A; 310/58

(58) Field of Classification Search .................. 290/1 A, 290/1 B, 1 R, 55; 123/2–3, 41.65, 41.66, 123/41.7, 198 E, 529, 557; 310/58, 89
See application file for complete search history.

(56) References Cited

U.S. PATENT DOCUMENTS 5,977,667 A * 11/1999 Hirose .......................... 310/51

FOREIGN PATENT DOCUMENTS

| | | | | |
|---|---|---|---|---|
| CN | 1823212 | A | | 8/2006 |
| EP | 893585 | A2 | * | 1/1999 |
| JP | 02196134 | A | * | 8/1990 |
| JP | 10-039878 | A | | 2/1998 |
| JP | 10039877 | A | * | 2/1998 |
| JP | 2002-070571 | A | | 3/2002 |
| JP | 2004-011491 | A | | 1/2004 |
| JP | 2004150446 | A | * | 5/2004 |
| JP | 2007-9732 | A | | 1/2007 |
| JP | 2007-107388 | A | | 4/2007 |

OTHER PUBLICATIONS

Chinese Office Action dated Jan. 12, 2011, issued in corresponding Chinese Patent Application No. 200810174035.1.
Japanese Office Action dated Dec. 14, 2011, issued in corresponding Japanese Patent Application No. 2007-293077.

* cited by examiner

*Primary Examiner* — Tran Nguyen
(74) *Attorney, Agent, or Firm* — Westerman, Hattori, Daniels & Adrian, LLP

(57) ABSTRACT

Reduce noises emitted from inlet and outlet of cooling air of a soundproof enclosed type generator. An inlet 20 and an outlet 26 of the cooling air are provided to the front and rear of a chassis 2, respectively. An air supply duct 8 is detachably mounted to the inlet 20, and an exhaust duct 9 is detachably mounted to the outlet 26. An air taking-in opening 8*a* facing downward is provided to the air supply duct 8 which guides the air towards horizontally opened inlet 20. The exhaust duct 9 is equipped with wall surface and a straightening vane 27 at a position opposed to the cooling air discharged from the outlet 26 to change the cooling air flow in complicated fashion to discharge it outside. Sound-absorption materials are pasted to the interior surface of the air supply duct 8 and the exhaust duct 9.

1 Claim, 5 Drawing Sheets

SOUNDPROOF ENCLOSED TYPE GENERATOR

BACKGROUND OF THE INVENTION

1. Field of the Invention

The present invention relates to a soundproof enclosed type generator, and particularly to a soundproof enclosed type generator suitable for improvement of soundproof performances.

2. Description of the Related Art

A soundproof enclosed type generator has a chassis enclosing the generator for the sake of protection of the generator (including engine, generator body, muffler, electric equipment control apparatus, or the like) from dusts and water as well as suppression of operating noises. The soundproof enclosed type generator accommodates the generator in the sealed chassis, and an inlet and an outlet of cooling air for cooling the generator are provided thereto. Therefore, there is such a drawback that operational noises of the generator leak from the inlet and outlet of the cooling air to outside. Accordingly, measures for suppression of leakage of operating noises to outside are taken. For example, according to the soundproof construction of the generating equipment described in Japanese Patent Application Laid-Open (JP-A) No. 2007-9732, soundproof partitions are provided inside the air suction hood in parallel with opening of the chassis, thereby reducing noises from the chassis inside.

However, with conventional generating equipment as mentioned above, although noises leaking from cooling air inlet to outside can be suppressed, no measure is considered for cooling air outlet and hence soundproof performances are not sufficient. Further, cooling air from a part where a control panel is provided can hardly hit the control panel, and cooling effect of the control panel is still insufficient.

As one measure to be provided for cooling air outlet, for example, such a construction is considered that in the construction where engine room accommodating the engine at the center of the chassis and generator body, muffler room accommodating the cooling air outlet muffler, and electric equipment room accommodating the control apparatus for cooling air inlet are provided, respectively, a cooling air guide is provided in the muffler room so as to introduce the cooling air around circumference of the muffler in order to prevent direct outflow of the cooling air from the engine room to the cooling air outlet. With this construction, complicated configuration of the pathway, in which the cooling air flows, allows the cooling air to go around muffler entirely and noises can be suppressed effectively by sound-absorption materials pasted to interior surface of the muffler room.

However, for example, depending on the specification of the country to which the generator is delivered, higher soundproof performances are required for the measure considered for cooling air outlet as mentioned, and it is envisaged that the measure is insufficient, and therefore, further improvement is desired.

Further, when a hood protruding greatly from the chassis is provided, a size of the generator apparatus become increased as is the case of the generator apparatus described in abovementioned patent publication, a demand for a generator apparatus to be as small as possible can not be satisfied.

The present invention has been made in light of the abovementioned request and an object of the present invention is to provide a soundproof enclosed type generator in which soundproof measures are provided for both inlet and outlet of the cooling air, upsizing is suppressed and at the same time, cooling effects of electric equipment control parts can be improved.

SUMMARY OF THE INVENTION

A first feature of the present invention is such that, in the soundproof enclosed type generator comprising an engine being accommodated in a chassis and a generator body being driven by the engine, the chassis has inlet and outlet of the cooling air, to the chassis is provided at least any one of an exhaust duct including wall surface for forming a pathway, which changes traveling direction of the cooling air leaving the outlet of the cooling air and then discharges the same to outdoor air, or an air supply duct including wall surface, which takes in cooling air from lower part, changes traveling direction of the cooling air taken in, and introduces the cooling air to the inlet of the cooling air, and sound-absorption materials are pasted to interior surface of the exhaust duct and air supply duct.

A second feature of the present invention is such that the exhaust duct and the supply duct are detachably mounted to the chassis.

A third feature of the present invention is such that the chassis comprises an electric equipment room for accommodating an electric equipment section of the generator, an engine room for accommodating the engine and generator body, and a muffler room for accommodating a muffler for silencing exhaust noise of the engine, and cooling air taken from the inlet of cooling air provided to the electric equipment room into chassis is introduced to the muffler room passing through the engine room and is discharged from the chassis passing through the outlet of the cooling air provided to the muffler room.

According to the present invention having the first feature, since operating noises of the generator introduced from inlet of the cooling air or emitted from the outlet are absorbed and attenuated by the air supply duct and exhaust duct, noise level of the generator can be reduced. In particular, since direction of the cooling air is changed in the exhaust duct and air supply duct, propagation path of noises generated can be lengthened, and higher sound-absorption effects developed by sound-absorption materials provided to interior surface of the exhaust duct and air supply duct are also obtainable. In addition, ingress of water droplets due to rain or the like from inlet or outlet of the cooling air can be suppressed by the exhaust duct and air supply duct.

According to the second feature, since the exhaust duct and air supply duct are detachable with regard to the chassis, depending on stringency of noise regulations, compact configuration can be used by removing the exhaust duct and air supply duct for a case where noise regulations are relaxed.

According to the present invention having the third feature, sound insulation can be provided by covering the engine and inlet of the cooling air, where noises of the generator body may leak easily, by the air supply duct, and engine exhaust noises are attenuated in the muffler room, noise level is further reduced in the exhaust duct before emission. Further, since the cooling air is first introduced in the electric equipment room, inverter device or the like in the electric equipment room can be cooled effectively.

DETAILED DESCRIPTION OF THE PREFERRED EMBODIMENT

Figure 1:
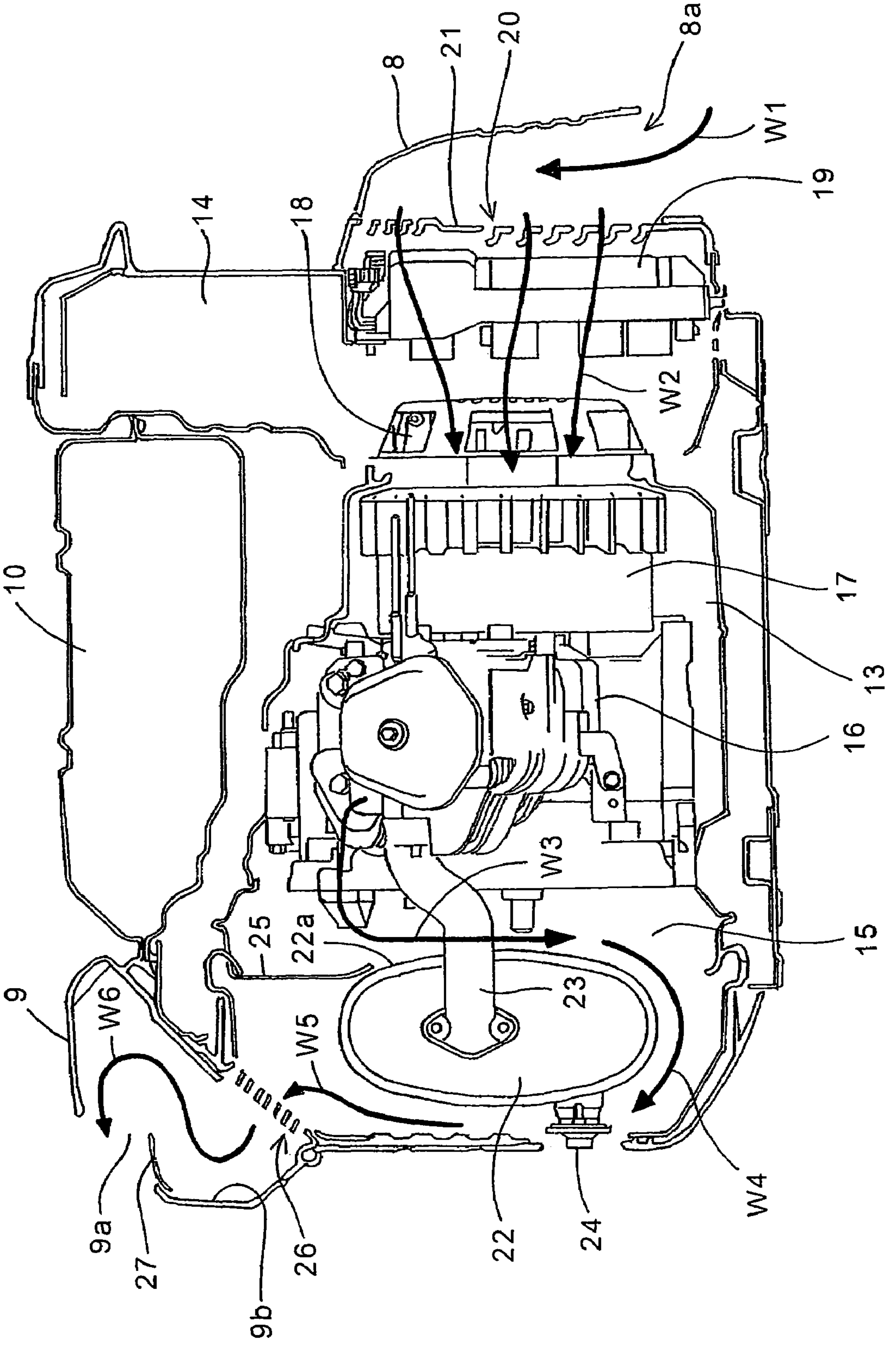
FIG. 1 is a sectional view of the soundproof enclosed type generator relating to one embodiment of the present invention.

Referring now to the drawings, the present invention will be explained hereafter in detail. FIG. 2 is a front perspective view of the soundproof enclosed type generator relating to one embodiment of the present invention. FIG. 3 is a rear perspective view of the same. In FIG. 2 and FIG. 3, a chassis 2 of a generator 1 accommodates a generator body (to be dealt with later) driven by the engine therein. The chassis 2 is sealed except for inlet and outlet of the cooling air. An electric equipment room (to be dealt with later) is provided at the front of the chassis 2, and to the front surface of the electric equipment room are provided an output terminal 4, and an operation panel 7 including an operation unit 5 and a display unit 6. Inlet of the cooling air is provided at lower part of the operation panel 7, which is not depicted in FIG. 1 since inlet of the cooling air is covered by an air supply duct 8. The air supply duct 8 takes air from outside through a duct inlet 8*a* at lower part. The air supply duct 8 will be described later.

An exhaust duct 9 is provided at rear upper part of the chassis 2. The exhaust duct 9 is disposed at outlet of the cooling air being formed at rear upper part of the chassis 2. The exhaust duct 9 discharges the air passed through the chassis 2 and cooled the generator body or the like from a duct outlet 9*a* at upper part. The exhaust duct 9 will be described later.

A fuel tank 10 is provided to upper part of the chassis 2, a pair of stands 11 are provided to front lower part of the chassis 2, and a pair of wheels 12 are provided at sides of the rear.

Figure 2:
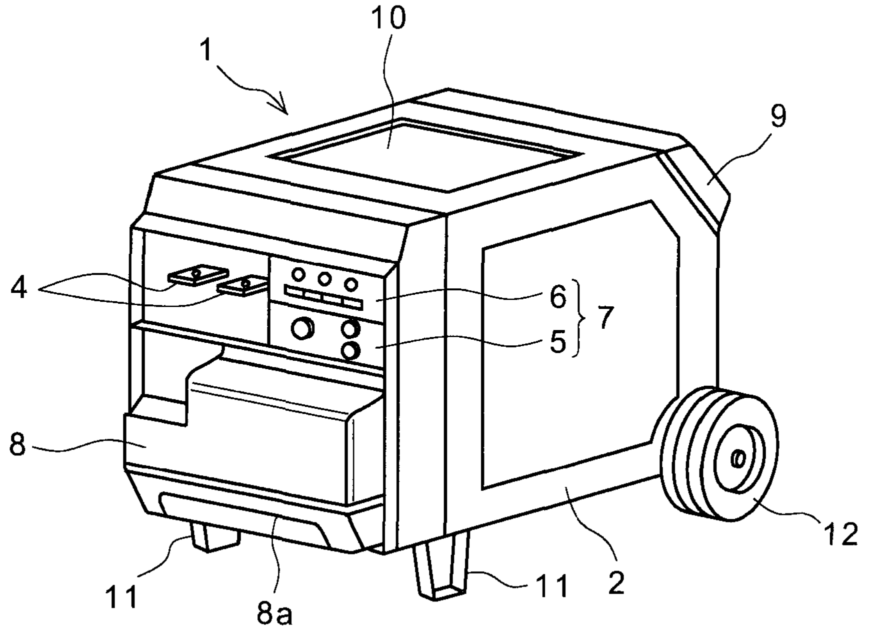
FIG. 2 is a front perspective view of the soundproof enclosed type generator relating to one embodiment of the present invention.
Figure 3:
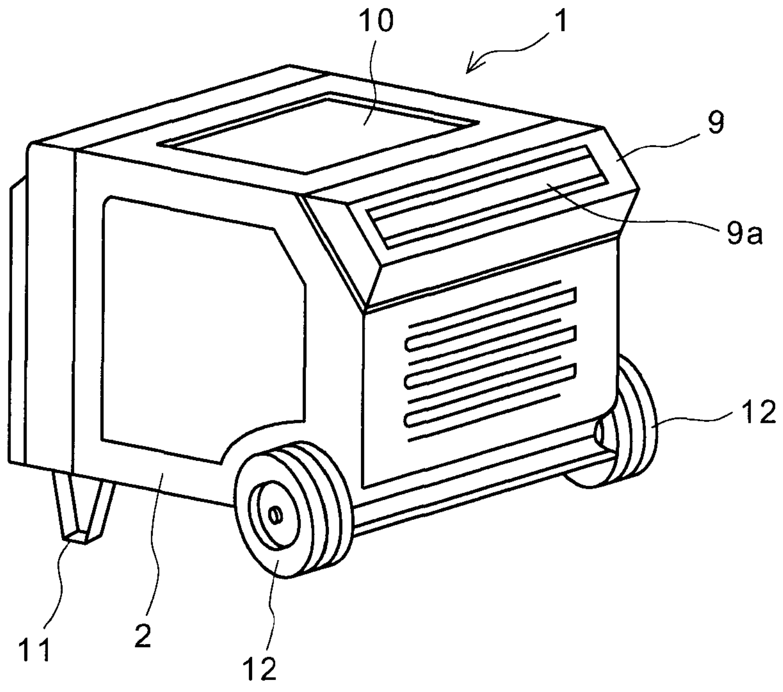
FIG. 3 is a rear perspective view of the soundproof enclosed type generator relating to one embodiment of the present invention.

FIG. 1 is a sectional view of the generator 1, while in FIG. 2 and FIG. 3, the same reference number denotes the same or identical portion. The chassis 2 includes an engine room 13, an electric equipment room 14 provided to the front (right in the drawing) of the engine room 13, and a muffler room 15 provided at the rear (left in the drawing) of the engine room 13, and the engine 16 and a generator body 17 being driven by the engine 16 are disposed in the engine room 13. A fan 18 is provided at the front of the generator body 17. The fan 18 is disposed so as to face the electric equipment room 14.

An inverter device 19 for outputting electric power generated by the generator body 17 to the outside is provided to the electric equipment room 14. As for the inverter device 19, the front thereof is opposed to an inlet 20 of the cooling air provided to the front of the chassis 2, and rear thereof is opposed to the fan 18. A louver 21 is provided to the inlet 20 of the cooling air, and outdoor air being sucked by the fan 18 is taken into the chassis 2 passing through the louver 21. The air supply duct 8 covering the louver 21 is provided to the inlet 20 of the cooling air. The air supply duct 8 is closed at upper part, front part and side part except for the duct inlet 8*a* at lower part. Sound-absorption materials are pasted to the interior surface of the air supply duct 8. For sound-absorption materials, for example, glass wool is preferable. Outlet cables wired to an output terminal 4 and cables wired to the operation panel (neither of them is shown) are accommodated in the upper space of the electric equipment room 14.

A muffler 22 is disposed to the muffler room 15 and an exhaust pipe 23 coming from the engine 16 is connected to the muffler 22. An exhaust port 24 of the muffler 22 is disposed faced towards the rear of the chassis 2. The muffler room 15 and the engine room 13 are divided by wall surface (engine side wall surface) 22*a* of the muffler 22 and a partition plate 25 extending upwardly along with the wall surface 22*a*.

An outlet 26 of the cooling air equipped with the louver is provided to upper part of the muffler room 15 and the exhaust duct 9 is provided with regard to the outlet 26. The exhaust duct 9 is made of resin material. A straightening vane 27 is provided to upper end of wall surface 9*b* to which exhaust being directed by the louver and discharged from the outlet 26 will hit, i.e., lower edge of the duct outlet 9*a* of the exhaust duct 9. Sound-absorption materials (not shown)) are pasted to inner wall of the muffler room 15 and the exhaust duct 9. For sound-absorption materials, for example, glass wool is preferable.

Figure 4:
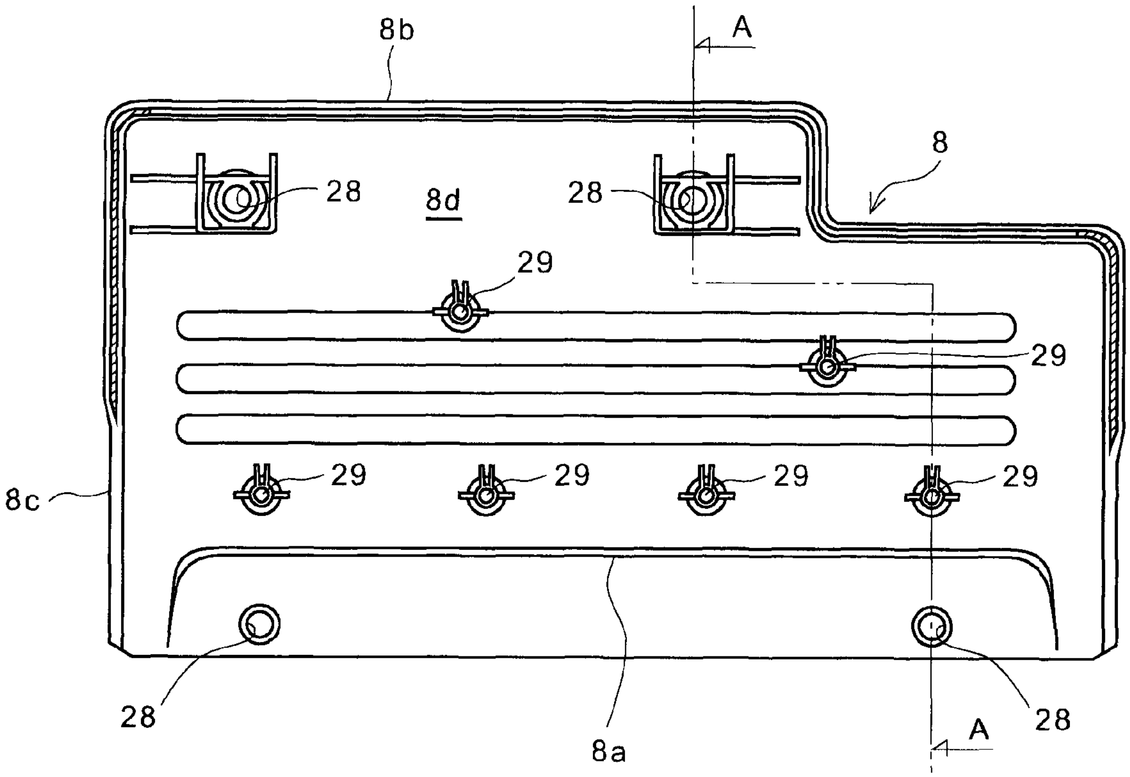
FIG. 4 is a rear view of the air supply duct.
Figure 5:
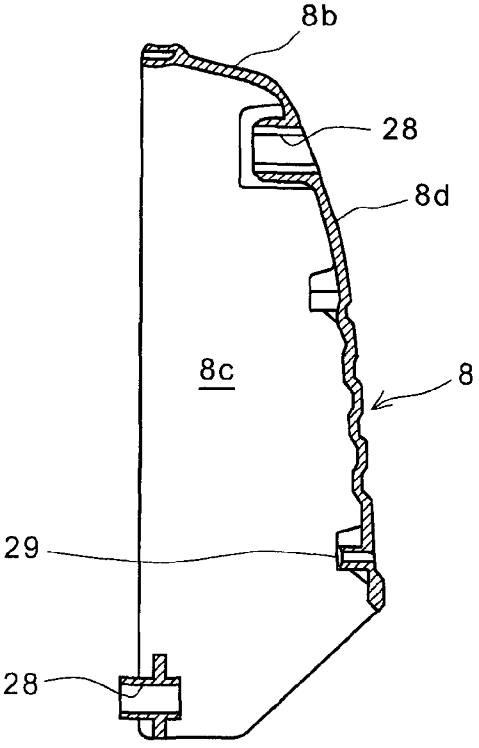
FIG. 5 is a sectional view looked from A-A section in FIG. 4.

The air supply duct and the exhaust duct will be explained. FIG. 4 is a rear view of the air supply duct 8 and FIG. 5 is a sectional view looked from A-A section in FIG. 4. The air supply duct 8 has walls 8*b*, 8*c*, 8*d*, respectively at three surfaces of upper, side, and front, and to the front wall 8*d* are formed bolt through-holes 28 at four locations and tapping holes 29 at six locations. The bolt through-hole 28 is used when the air supply duct 8 is mounted to the chassis 2. A bolt is passed from front side (right in FIG. 5) through the bolt through-hole 28 and screwed into a screw hole (not shown) provided to the chassis 2 side to secure the air supply duct 8 to a position opposed to the inlet 20 of the cooling air of the chassis 2. The tapping hole 29 is for mounting of a sound-absorption plate and is used to secure the sound-absorption plate (not shown) being formed by materials developing sound-absorption effects (e.g., glass wool) to the rear of the air supply duct 8 by tapping.

Figure 6:
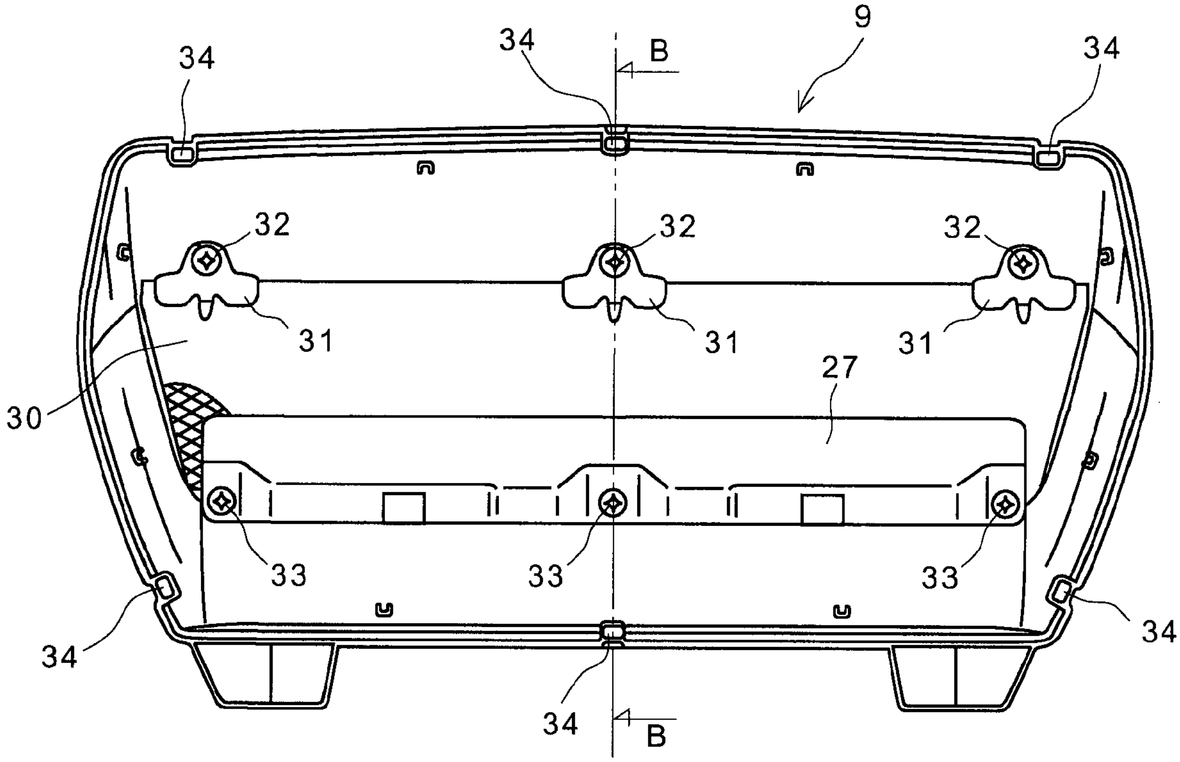
FIG. 6 is a rear view of an exhaust duct 9.
Figure 7:
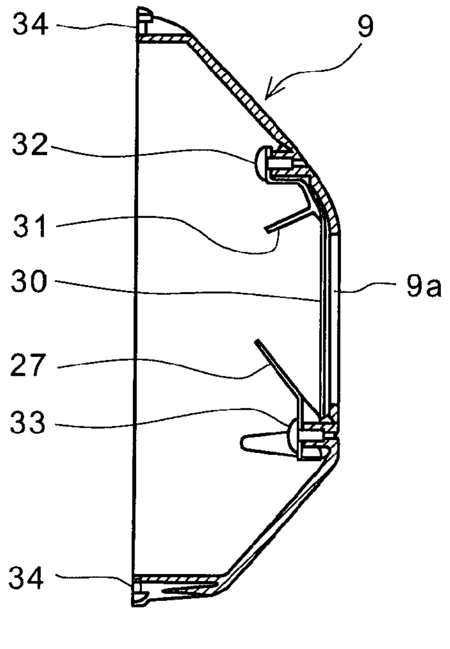
FIG. 7 is a sectional view looked from B-B section in FIG. 6.

FIG. 6 is a rear view of the exhaust duct 9 and FIG. 7 is a sectional view looked from B-B section in FIG. 6. A horizontally long (long in lateral direction in FIG. 6) window, i.e., duct outlet 9*a*, is formed to the front of the exhaust duct 9, and a mesh 30 for prevention of entry of dusts or the like into the chassis 2 is provided to the duct outlet 9*a*. The mesh 30 is held by three clamps 31 at upper side thereof, while lower side is held by the straightening vane 27. That is, the straightening vane 27 has a function for guiding the cooling air and a function for holding the mesh 30. Tapping screws 32, 33 for securing the clamp 31 and the straightening vane 27 are screwed into the tapping hole provided to the exhaust duct 9.

A concave 34 having dimensions being set to allow coupling with a convex (not shown) to be provided to the chassis 2 side is provided to the edge of the exhaust duct 9. When the exhaust duct 9 is mounted to the chassis 2, the exhaust duct 9 is opposed to the outlet 26 of the cooling air, and convex at the chassis 2 side and the concave 34 are coupled for fixing.

Sound-absorption materials such as glass wool are pasted to the interior surface of the exhaust duct 9 as is the case of the inner wall of the air supply duct 8 and the muffler room 15.

Operations of the generator 1 having above-mentioned construction will be explained referring mainly to FIG. 1. When a start switch provided on the operation unit 5 of the operation panel 7 is turned ON, the engine 16 starts rotating, the generator body 17 is driven and power generation is performed. Output of the generator is controlled to a desired frequency and voltage level by the inverter device 19, connected to the output terminal 4, and electric power is supplied to a load. Since the generator body 17 and the inverter device 19 well known in the art can be used, detailed explanation will be omitted.

As the generator body 17 is driven, the fan 18 connected to the generator body 17 rotates and the cooling air is taken into the chassis 2. The cooling air flows upwardly from the duct inlet 8*a* of the air supply duct 8 into the air supply duct 8 as shown by arrow W1 in FIG. 1. After that, direction of the cooling air is changed horizontal in the air supply duct 8 as shown by arrow W2, passes through the inlet 20 of the cooling air of the chassis 2, and is taken into the electric equipment room 14 while cooling the inverter device 19. The cooling air can cool other parts and cables in the electric equipment room 14 as well as the inverter device 19.

The cooling air being taken into the chassis 2 by the fan 18 enters from the electric equipment room 14 to the engine room 13 and enters the muffler room 15 after flowing along with outer wall of the generator body 17 and the engine 16. Since boundary between the engine room 13 and the muffler room 15 is separated by the partition plate 25 and outer wall 22*a* of the muffler 22, the cooling air entering the muffler room 15 is once guided downwardly along with periphery of the muffler 22 as shown by arrow W3. After that, the cooling air goes up along with periphery of the muffler 22 as shown by arrows W4, W5, passes through the outlet 26 of the cooling air and is discharged into the exhaust duct 9.

The cooling air discharged into the exhaust duct 9 hits the interior surface of lower wall surface 9*b* of the exhaust duct 9, and its direction is changed along with the straightening vane 27 located at upper part thereof. After that, the cooling air hits upper interior surface of the exhaust duct 9, its direction is further changed, and is discharged outdoor after passing through the duct outlet 9*a*. In other words, shapes and arrangements of wall surface of the exhaust duct 9 and the straightening vane 27 are set so that the cooling air entered in the exhaust duct 9 draws S-shape as shown by arrow W6 and flows in the exhaust duct 9 passing as much longer pathway as possible.

Operating noises of the generator 1 include vibration noise of the chassis 2, exhaust noise and suction noise of the engine, and suction noise and discharging noise of the cooling air. It has been found by experiments conducted by the present inventors that, of these noises, suction noise and discharging noise of the cooling air account for 50% or more of noises generated by the generator 1.

With the generator 1 according to the present embodiment, the air supply duct 8 is provided to the inlet 20 of the cooling air, consideration is given so that the cooling air flows along with the interior surface thereof, and sound-absorption materials are provided so that passing noise of the cooling air is absorbed in the air supply duct 8. Therefore, the amount of leakage of passing noise of the cooling air from the inlet 20 to the outside can be suppressed. Operating noises of the engine 16, the generator body 17, and the fan 18 leak in part from the inlet 20, and leakage of these operating noises can be suppressed as well as passing noise of the cooling air from the inlet 20.

At exhaust side, the cooling air circulates in the muffler room 15 and therefore, passing noise of the cooling air and operating noise of the engine 16 or the like are absorbed by the sound-absorption materials provided in the muffler room 15. In the exhaust duct 9, in addition to that the cooling air flows passing through bypass route, passing noise of the exhaust and operating noise of the engine 16 or the like are discharged outside the chassis 2 passing through the bypass route similar to that of the cooling air. Therefore, loudness level of sound is reduced while passing through the bypass route, and it is possible to lower the sound noise discharged from the exhaust duct 9.

Figure 8:
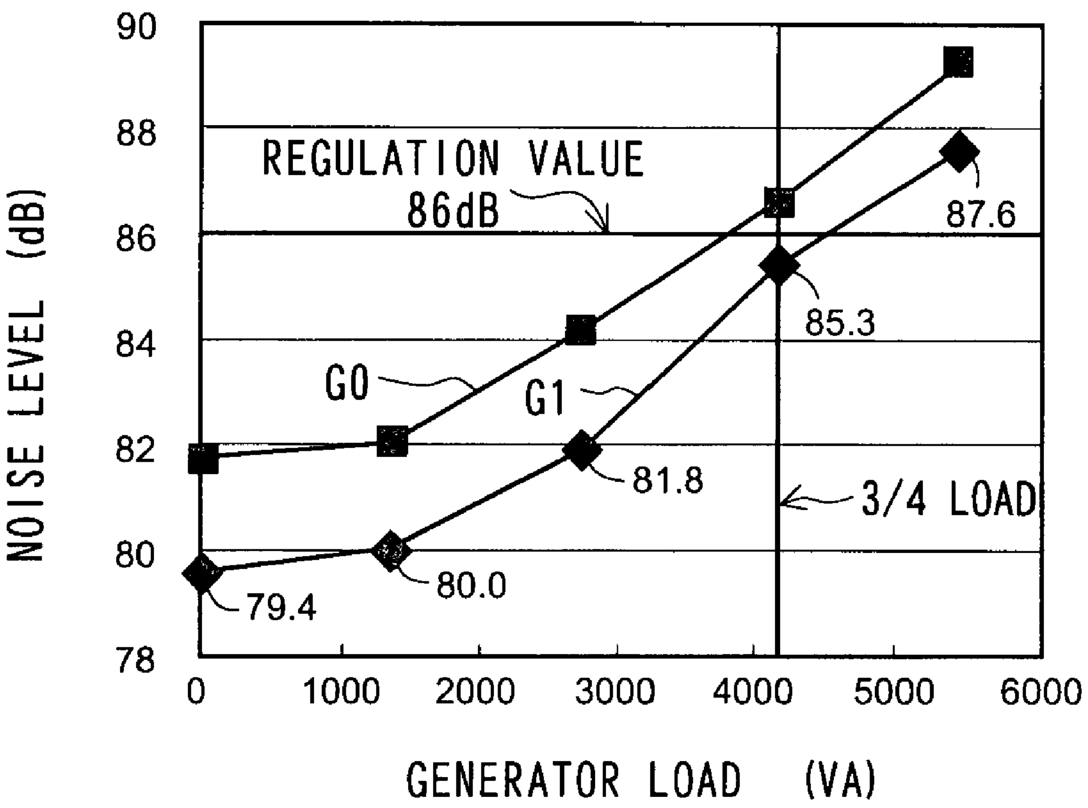
FIG. 8 is a graph showing results of noise measurements.

Noise suppression effects will be explained based on the experimental results. FIG. 8 is a graph showing results of noise measurements. In FIG. 8, horizontal axis represents generator load (VA) and vertical axis represents noise level (dB). Measurements of the noise were carried out on the generator (G0) from which the air supply duct 8 and the exhaust duct 9 were removed and on the generator 1 (G1) of the present embodiment. As it is known from FIG. 8, noise level at 4.2 KVA load, ¾ or more of the rated load 6.0 KVA, was 86.5 dB for the generator G0 and 85.3 dB for the generator G1. Noise level 85.3 with the generator G1 at ¾ load is lower than, for example, the regulation value of 86.0 dB required in India where stringent regulation values are used. In the meantime, measurement with the generator G0 without the air supply duct and the exhaust duct exceeded the regulation value of 86.0 dB. As mentioned, it is understood that, according to the present embodiment, suppression effects of noises emitted by the generator 1 are improved by the air supply duct 8 and the exhaust duct 9.

The air supply duct 8 and the exhaust duct 9 mounted to the generator 1 as shown in the present embodiment are fastened by bolts or by engagement fit by concave part made of resin material and convex part at chassis 2 side, and therefore, they are easily attached or detached to the chassis 2. Accordingly, complication that products with different sound insulation measures should be manufactured depending on the place of destination can be eliminated. Products without the air supply duct 8 and the exhaust duct 9 may be shipped to such district where noise regulation values are not stringent, and products with higher sound insulation measures such as the air supply duct 8 and the exhaust duct 9 shown in the present embodiment may be shipped to such district where noise regulation values are stringent.

With the present embodiment, splashing of water droplets such as rain from inlet or outlet of the cooling air into chassis inside occur rarely as well as that sound insulation effects are improved by the air supply duct 8 and the exhaust duct 9. Installation of either the air supply duct 8 or the exhaust duct 9 can improve sound insulation effects than conventional means.

What is claimed is:

1. A soundproof enclosed generator comprising:

an engine accommodated in a chassis and a generator body driven by the engine, wherein the chassis includes an electric equipment room accommodating an electric equipment, an engine room accommodating the engine and generator body, and a muffler room accommodating a muffler for silencing exhaust noise of the engine, wherein a cooling air from an inlet provided at a part of the electric equipment room is directed to the muffler room after passing through the engine room, and the cooling air is discharged through an outlet provided at a part of the muffler room, wherein a boundary between the engine room and the muffler room is defined by a partition plate and an outer wall of the muffler that directs the cooling air from the engine room to the muffler room with a change in air flow direction, and wherein the chassis further includes an exhaust duct having a wall surface that forms a pathway for exhausting the cooling air outputted from the outlet with a change in air flow direction, and an air supply duct having a wall surface that directs the cooling air from a lower portion of the chassis and through the inlet with a change in the air flow direction, both the exhaust duct and the air supply duct being detachably mounted and having a sound-absorption material disposed on an interior of the wall surfaces.

* * * * *